(12) United States Patent
Matsumoto et al.

(10) Patent No.: US 8,593,557 B2
(45) Date of Patent: Nov. 26, 2013

(54) SHOOTING ASSIST METHOD, PROGRAM PRODUCT, RECORDING MEDIUM, SHOOTING DEVICE, AND SHOOTING SYSTEM

(75) Inventors: Tetsuya Matsumoto, Tokyo (JP); Hotsumi Ihara, Tokyo (JP); Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 243 days.

(21) Appl. No.: 13/044,168

(22) Filed: Mar. 9, 2011

(65) Prior Publication Data

US 2011/0221922 A1    Sep. 15, 2011

(30) Foreign Application Priority Data

Mar. 10, 2010 (JP) ................................ 2010-053267
Feb. 21, 2011 (JP) ................................ 2011-034880

(51) Int. Cl.
*H04N 5/222* (2006.01)
*H04N 5/225* (2006.01)
*G06K 9/00* (2006.01)

(52) U.S. Cl.
USPC ...................... 348/333.02; 348/169; 382/118

(58) Field of Classification Search
USPC ......... 348/143, 169, 171–172, 222.1, 333.01, 348/333.02, 333.05; 382/115–118
See application file for complete search history.

(56) References Cited

U.S. PATENT DOCUMENTS

| 2001/0026320 | A1* | 10/2001 | Seo .............................. 348/222 |
| 2005/0243183 | A1* | 11/2005 | Obrador ..................... 348/222.1 |
| 2006/0204057 | A1* | 9/2006 | Steinberg ..................... 382/118 |
| 2007/0171296 | A1* | 7/2007 | Tsukiji et al. ................ 348/345 |
| 2008/0181460 | A1* | 7/2008 | Tamaru ........................ 382/103 |
| 2008/0317295 | A1* | 12/2008 | Koutaki ....................... 382/118 |
| 2009/0040324 | A1  | 2/2009 | Nonaka |
| 2009/0322895 | A1* | 12/2009 | Miyata ....................... 348/222.1 |
| 2010/0103286 | A1* | 4/2010 | Akiyama .................... 348/231.6 |
| 2010/0157084 | A1* | 6/2010 | Shimamura et al. ....... 348/222.1 |
| 2010/0173678 | A1* | 7/2010 | Kim et al. .................... 455/566 |

FOREIGN PATENT DOCUMENTS

| JP | 2004-208113 | 7/2004 |
| JP | 2005-210366 | 8/2005 |
| JP | 2008-301231 | 12/2008 |
| JP | 2009-044602 | 2/2009 |

* cited by examiner

*Primary Examiner* — Kelly L Jerabek
(74) *Attorney, Agent, or Firm* — Young & Thompson (57) ABSTRACT

The method includes producing first identification data used as reference; performing subject recognition on acquired images of subjects to obtain recognition images, producing second identification data, and matching the first identification data with the second identification data; tallying the acquired images based on matching results for each subject and by shooting tendency factor; judging whether a number of the acquired images or a proportion of the number of the acquired images of the subjects in respect of each of the shooting tendency factors is within a given range from tally results of the acquired images; and providing shooting assist so that the number of the acquired images or the proportion of the number of the acquired images in respect of the shooting tendency factor judged to be outside the given range is placed within the given range.

33 Claims, 9 Drawing Sheets

|  | A | B | C |
|---|---|---|---|
| FULL-LENGTH | × | ○ | × |
| SMILE | ○ | ○ | × |
| CLOSEUP | ○ | × | × |

FIG.11B

|  | A | B | C |
|---|---|---|---|
| FULL-LENGTH | 0 | 2 | 0 |
| SMILE | 5 | 5 | 0 |
| CLOSEUP | 10 | 0 | 0 |

SHOOTING ASSIST METHOD, PROGRAM PRODUCT, RECORDING MEDIUM, SHOOTING DEVICE, AND SHOOTING SYSTEM

BACKGROUND OF THE INVENTION

The present invention relates to a shooting assist method for shooting a plurality of persons in a balanced, impartial manner, a program product for executing the method on a computer, a computer-readable recording medium in which this program is recorded, a shooting device, and a shooting system.

Shooting all of the persons (children) who participated in a particular event without imbalance in, for example, the number of acquired images could only be achieved with the operator checking the lists of participants or otherwise consciously taking some action for ensuring that all the persons concerned are shot without bias in the number of images acquired of them. Shooting without consciously trying to be impartial often resulted in more images acquired of some particular children or even failing to shoot some of them.

JP 2005-210366 A describes a shooting assist system whereby an operator sends an acquired image representing a group of persons to an image judgment device, which judges whether each of the persons of the group has been shot and provides the operator with person information on the persons yet to be shot.

JP 2008-301231 A describes a shooting device that produces schedule information from entered location name information and date information, uses the schedule information to produce mode list information, sets the mode list information in the shooting device, reads out a list from the mode list information, uses the location information and date information registered in the list as starting conditions to compare acquired location information and date information, and, upon detecting a coincidence, enables shooting operation under the conditions stored in the list.

JP 2009-044602 A describes classifying still image data acquired by a shooting unit with an image classifying unit and displaying on a monitor information on images recommended as subjects to be shot based on classification results so that images may not be acquired only of particular persons in events such as athletic meets and school plays.

JP 2004-208113 A describes registering images of targets to be shot by target and analyzing images based on the target images to produce and output guide information corresponding to shooting conditions that vary with the registered target images.

SUMMARY OF THE INVENTION

However, the shooting assist system described in JP 2005-210366 A, which uses the image judgment device connected via the portable phone carried by the operator to make judgment on an acquired image, cannot be used in a location where a communication device such as a portable phone cannot be used. In addition, the delay due to the intermediacy of a communication line posed a problem of an increased time required to make judgment on an acquired image.

The shooting device described in JP 2008-301231 A, which uses information on a predetermined schedule, operator's position information, and date information to set shooting conditions, can be used to ensure that some particular sites to be visited on a trip are shot without fail but cannot be applied to shooting assist for ensuring, for example, that none of the persons fails to be shot.

JP 2009-044602 A and JP 2004-208113 A describe giving information on a shooting tendency in which more than a given number of images were acquired of a particular person with a particular shooting tendency (e.g., portrait in profile) for balanced shooting tendency and an unbiased proportion in the number of images but fail to describe shooting expressly another person when there is a shooting tendency with which fewer images have been acquired of this person.

An object of the present invention is to provide a shooting assist method enabling balanced shooting, wherein, when subjects constituting a group are to be shot, the subjects can be shot in a well-balanced proportion with respect to the aspects of shooting such as proportion in the number of images acquired, subjects, and composition by separately identifying the subjects, tallying the number of images, and notifying the operator of a shooting tendency by means of a histogram or the like. It is also an object of the invention to provide a program for implementing that method on a computer, a computer-readable recording medium in which this program is recorded, a shooting device, and a shooting system.

In order to attain the object described above, the present invention provides a shooting assist method for acquiring an image comprising the steps of:

producing first identification data used as reference, performing subject recognition on acquired images of subjects to obtain recognition images, producing second identification data of the subjects of the acquired images, and matching the first identification data with the second identification data, tallying the acquired images based on matching results for each subject having the first identification data and by shooting tendency factor, judging whether a number of the acquired images or a proportion of the number of the acquired images of the subjects having the first identification data in respect of each of the shooting tendency factors is within a given range from tally results obtained by tallying the acquired images, and providing shooting assist so that the number of the acquired images of the subjects or the proportion of the number of the acquired images of the subjects having the first identification data in respect of the shooting tendency factor judged to be outside the given range is placed within the given range, wherein, when a number of acquired images of a particular subject having the first identification data and containing a particular shooting tendency factor is smaller than a given threshold, shooting assist is provided in respect of the particular shooting tendency factor so as to place the number of the acquired images or the proportion of the number of the acquired images within the given range.

Also, the present invention provides a computer program product, comprising a computer readable recording medium having a computer program code recorded thereon, for causing a computer to execute the steps of the shooting assist method described above.

Also, the present invention provides a non-transitory computer readable recording medium wherein the computer program code described above is recorded.

Also, the present invention provides a shooting device for assisting in shooting when acquiring an image comprising the steps of:

a shooting unit, an identification data production unit for producing first identification data used as reference, a matching unit for performing subject recognition on acquired images of subjects acquired by the shooting unit to obtain recognition images, producing second identification data of the subjects of the acquired images, and matching the first identification data with the second identification data, a tally unit for tallying the acquired images based on matching results for each subject having the first identification data and by each shooting tendency factor, a shooting tendency factor judgment unit for judging whether a number of the acquired images or a proportion of the number of the acquired images of the subjects having the first identification data in respect of each of the shooting tendency factors is within a given range from tally results obtained by tallying the acquired images, and a shooting assist unit for providing shooting assist so that the number of the acquired images or the proportion of the number of the acquired images of the subjects having the first identification data in respect of the shooting tendency factor judged to be outside the given range is placed within the given range, wherein, when a number of the acquired images of a particular subject having the first identification data and containing a particular shooting tendency factor is smaller than a given threshold, shooting assist is provided in respect of the particular shooting tendency factor so as to place the number of the acquired images or the proportion of the number of the acquired images within the given range.

Thus, the present invention enables balanced shooting, wherein subjects constituting a group can be each shot with an impartial, unbiased proportion by identifying the subjects, tallying the number of images, and notifying the operator of a shooting tendency by means of a histogram or the like, and automatically setting a shooting mode. Further, the present invention enables production of a photograph album with which the subjects can be highly satisfied because of a balanced proportion in which the subjects were shot.

BRIEF DESCRIPTION OF THE DRAWINGS

FIG. 12 is a conceptual view illustrating an example where data such as first identification data and shooting data of a plurality of persons are transmitted via a network, a server, and the like.

DETAILED DESCRIPTION OF THE INVENTION

The following describes in detail the shooting device of the present invention based upon the preferred embodiments illustrated in the accompanying drawings. Note that in the following embodiments, the subjects are persons, and face recognition is used to identify the subjects.

Figure 1:
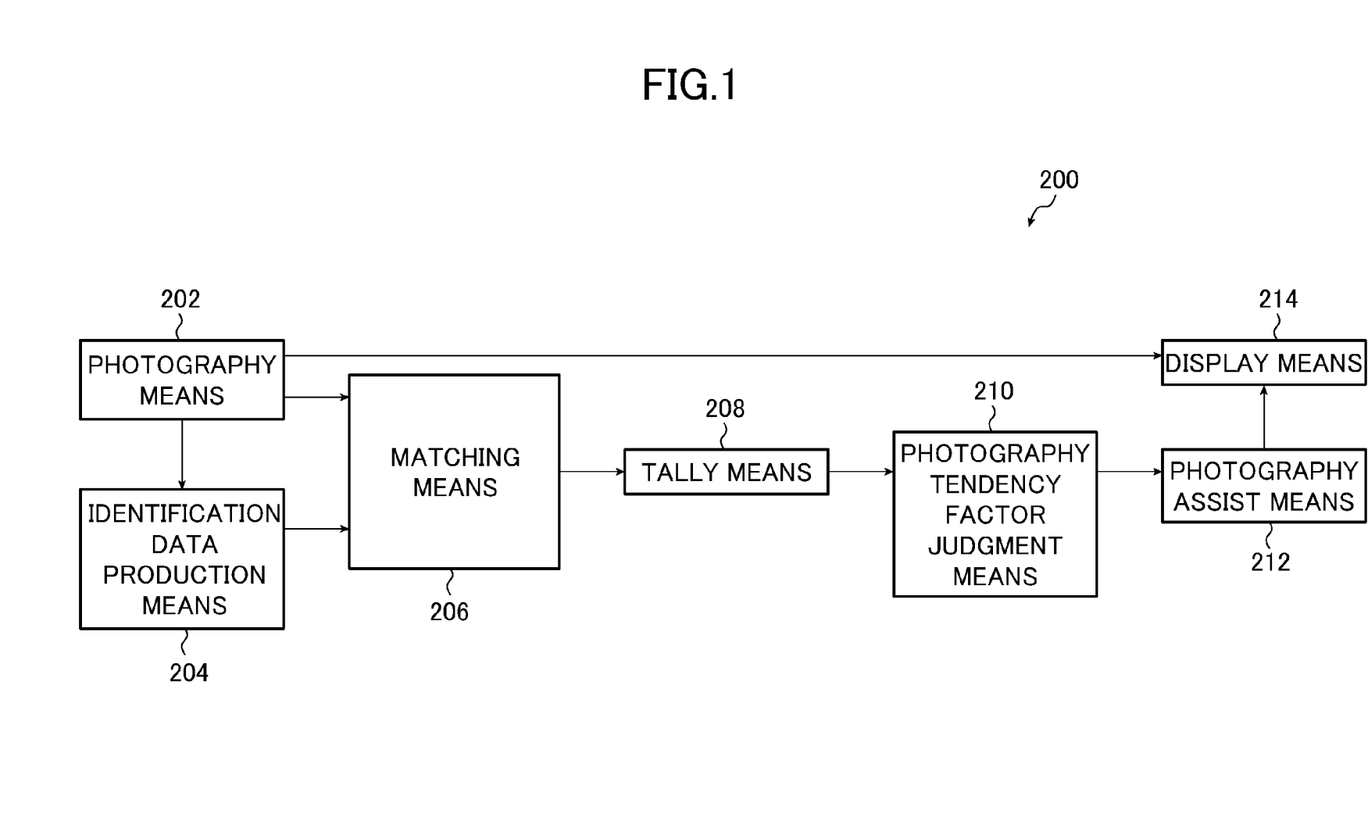
FIG. 1 is a block diagram showing an example of a configuration of the shooting device for implementing the shooting assist method of the present invention.

FIG. 1 is a block diagram showing an example of the configuration of the shooting device of the present invention.

A shooting device 200 illustrated in FIG. 1 comprises a shooting means 202, an identification data production means 204, a matching means 206, a tally means 208, a shooting tendency factor judgment means 210, a shooting assist means 212, and a display means 214.

The shooting means 202 is an imaging device comprising image sensors such as lenses, CCD, and CMOS for acquiring images. First, to produce identification data of persons belonging to a group (first identification data used as reference), a group photograph is taken showing all the members of that group. Then, snapshots and the like are acquired in an event, etc. held by that group in an normal manner. Of the images thus acquired, the group photograph and the other normal images are outputted respectively as identification acquired image data and normal acquired image data.

The first identification data may be produced using other data than a group photograph. For example, the shooting mode of the shooting device 200 such as a digital camera may be set to "person registration mode" to shoot each person of the group and register him/her, repeating this process to produce the first identification data on all the persons of the group. The registration need not be done on site; for example, be performed when the operator returns home by producing the first identification data and accomplishing registration based on the acquired images. The first identification data may be produced using a personal computer or the like in lieu of the shooting device and transmitted to the shooting device 200 for storage. Alternatively, existing first identification data that was produced based on images acquired in the past may for example be used.

The identification data production means 204 is supplied with identification acquired image data outputted from the shooting means 202. The identification data production means 204 performs face recognition on identification acquired image data to extract the faces of all the members of the group. Thus, recognition image is acquired. The first identification data of each group member is produced from the acquired recognition image and outputted. The first identification data can be additionally registered in the course of shooting. In lieu of face recognition, one may use subject recognition for distinction between still objects or animals (pets), landscapes, parts of a human body (hands, legs, etc.) and the like (still object recognition, animal recognition, landscape recognition, human body part recognition, etc.).

The matching means 206 is supplied with the first identification data outputted from the identification data production means 204 and the normal acquired image data outputted from the shooting means 202. The matching means 206 holds the first identification data and, when the normal acquired image data is entered, performs face recognition on the normal acquired image data to extract the recognized faces. Thus, a recognition image is acquired, and second identification data is produced. The produced second identification data and the first identification data are matched to determine a person that was shot. At this time, shooting tendency factors of a subject person such as whether the photograph shows the person in full length, whether it shows the person smiling, whether the photograph shows the person up close are also determined. The judgment results are outputted as matching data. The shooting tendency factors further include facial expressions (e.g., angry faces, crying faces), poses, postures, faces as seen from different angles (e.g., front, profile, a face looking up), the size of a face (number of pixels, ratio), the number of persons, a combination of subjects (e.g., a combination of A and B), and the like. Parts of the face such as eyes and a mouth may be included in the factors in addition to the normal up-close faces.

Factors such as still objects and animals, landscapes, parts of a human body, etc. that enable subject recognition may be combined in addition to face recognition for subject recognition to produce the first identification data and the second identification data, thereby achieving matching of the thus obtained the first identification data and the second identification data. Identification of an individual by face recognition is not essential; only face detection may be done to perform matching of the face area data in the first identification data and the face area data in the second identification data.

The tally means 208 is supplied with the matching data outputted from the matching means 206, and tallies normal acquired image data judged to contain a person or persons separately not only by persons having the first identification data but by the shooting tendency factors of the respective persons based on the matching data, outputting the tally results. That is, the number of images acquired and the number of images sorted out by the shooting tendency factors are tallied separately for each member of the group and outputted as tally results. The operator can check the tally results by person having the first identification data or using a two-dimensional graph or the like.

The shooting tendency factor judgment means 210 is supplied with the tally results outputted from the tally means 208. The shooting tendency factor judgment means 210 determines persons and the shooting tendency factors of which fewer images than a mean number of images have been acquired and outputs shooting balance information. Other conditions, such as the difference in number of images acquired between a person most frequently shot and a person shot least frequently, may be set to produce the shooting balance information.

In addition, when images of a particular person containing a particular shooting tendency factor (e.g., profile) were acquired in a given number or more and when the number of images acquired of any other person containing that particular shooting tendency factor (e.g., profile) is below a given threshold, that particular shooting tendency factor (e.g., profile) of the other person may be outputted as shooting balance information in order to achieve a balance in the whole shooting tendency.

For example, where a given range is a proportion of a half or more of a mean value of the number of images, when images of a particular person containing a particular shooting tendency factor (profile) were acquired in a number not less than a mean number of images and when the number of images acquired of any other person containing that particular shooting tendency factor (profile) is below a half of the mean number of images, that particular shooting tendency factor (e.g., profile) of the other person is outputted as shooting balance information. Although the lower limit of the given range is equal to the given threshold in this case, they may be different, or an upper limit of the given range may be twice as great as the mean value. The given range may be the number of acquired images as well as the proportion of the number of acquired images Further, when images were acquired in a number not less than a given number, say 50, or when the storage device such as a memory card has a free space left not greater than a given space (e.g., 10% or less of its whole space), the given range, the given number of images, and the given threshold may be changed. Changing the given range, the given number of images, and the given threshold enable balanced shooting in respect of the images acquired thereafter and balanced shooting with a small free space left in the storage device.

Figure 13A:
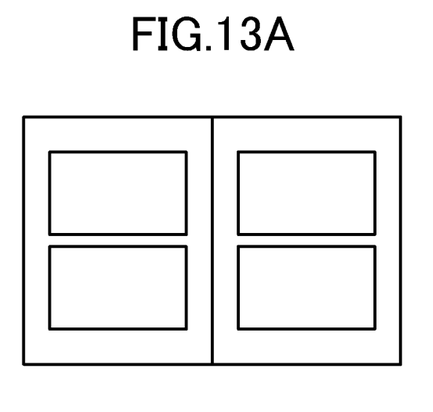
FIG. 13A illustrates an example of a photograph album with all the pages containing areas having a homogeneous size.
Figure 13B:
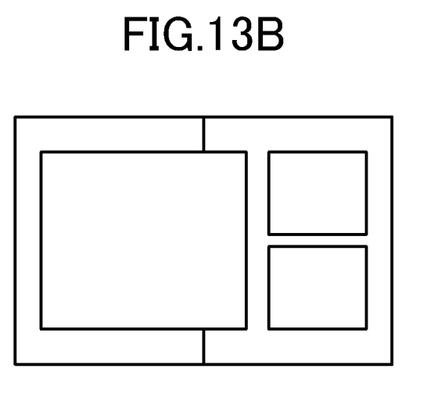
FIG. 13B illustrates an example of a photograph album wherein each page may contain a plurality of areas different in size.

The given range, the given number of images, and the given threshold may be manually adjustable. For example, the given range, the given number of images, and the given threshold may be determined according to the kinds of materials such as photograph albums. Where all of the pages of a photograph album containing areas having a homogeneous size as illustrated in FIG. 13A, the images can be fitted to these areas by acquiring images with a homogeneous size. On the other hand, where, as illustrated in FIG. 13B, the photograph album contains areas having different sizes such as large areas and small areas, the number of images are acquired in a ratio corresponding to the ratio of such large and small areas.

Alternatively, a range entered by the operator who acquired the images in the shooting device 200 such as a digital camera may be set as the given range, or still alternatively, the given range that is set may be one entered in the shooting device 200 by a person who provides service of producing photographic prints from the acquired images in association with a product such as a photograph album and the like. Alternatively, a "definition file" may be produced for the operator or the person who provides the above-mentioned service to set the given range, the given number of images, and the given threshold, so that these factors may be registered in the shooting device 200 using this definition file.

Alternatively, the kinds of product such as a photograph album may be selectable before shooting in the shooting device 200 to permit setting of the given range, the given number of images, and the given threshold according to the kind of product selected. For example, when a photograph album containing 40 pages is selected, the number of images to be acquired is set to 40; when a photograph album containing 20 pages is selected, the number of images to be acquired is set to 20. Thus, the number of images to be acquired is determined according to the kind of product selected.

Alternatively, the sizes of images as printed may be selectable before shooting in the shooting device 200 to permit setting of the given range according to the print sizes selected. For a large print size, for example, the face of a person in an acquired image may be small; for a small print size, an image in which the face of a person is large is preferably to be acquired. In a case where the face of a person in an image to be acquired is smaller than a given size, the recording size of such an image (i.e., the resolution of the acquired image) is preferably increased automatically.

Further, when a person of whom the number of images acquired has yet to reach a given number is in a shooting area (i.e., in a viewfinder of the shooting device 200 such as a digital camera), a moving image recording mode or a continuous shooting mode is preferably selected automatically.

In this case, shooting may be started automatically without the operator pressing the shutter button, and an acquired image or images may be stored automatically. Furthermore, the automatically stored image may be analyzed to remove unnecessary images except those showing profiles, front faces, and the like automatically.

The shooting assist means 212 is supplied with shooting balance information outputted from the shooting tendency factor judgment means 210. The shooting assist means 212 provides assist based on the shooting balance information so that persons that have been shot relatively less frequently may be shot in order to maintain a balance in the number of images. Such shooting assist is provided by, for example, displaying the face, enlarged, of a person of whom images have been acquired relatively in a fewer number, or by indicating a frame around such a person that has been shot less frequently, or showing a shooting tendency factor that has not yet been shot in the image verification screen showing a two-dimensional graph on a display means 21 described later. The assist may also be provided by displaying a message, giving an audio notice to the operator, or displaying a person that has been shot less frequently. For example, shooting assist may be provided by displaying a message or producing a sound to give an instruction for taking a certain number of photographs of a person, an animal, a landscape, a part of a human body.

Further, where the above assist is provided in the image verification screen, when, for example, the operator selects an item (person or number of images) for which the number of images so far acquired is relatively small or a shooting tendency factor shown in the two-dimensional graph, a tally result, and the like, a mode may be automatically set to select shooting conditions (shutter speed, aperture, etc.) suitable for acquiring an image of a selected item or the like.

In such an automatically set shooting mode, when, for example, a person of whom the number of images that have been acquired is zero enters the viewfinder, images may be acquired with the focus automatically placed on that person, an audio notice may be given, a message may be displayed, or a frame may be shown around the face of that person to prompt the operator to take images containing a particular shooting tendency factor.

Assist may alternatively be provided by setting appropriate shooting conditions for complementing a selected shooting tendency factor.

The display means 214 displays the output of the shooting means 202 (i.e., the viewfinder) and the output of the shooting assist means 212, and verifies an acquired image, among other functions. The display means 214 may be a liquid crystal display, an organic EL (electro-luminescence) display, and the like.

Now, we will describe the operations of the shooting device of the invention for implementing the method of the invention.

Figure 2:
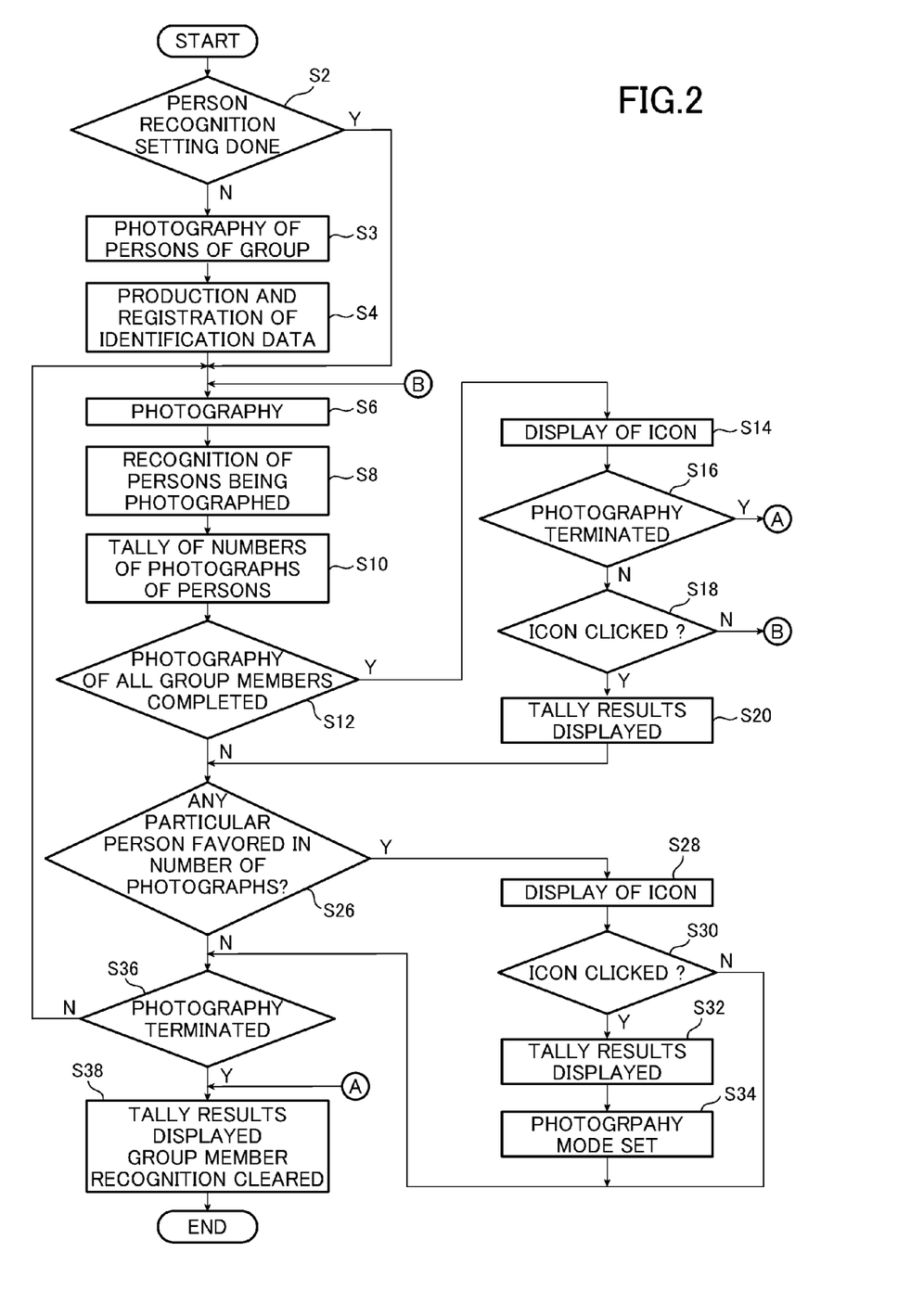
FIG. 2 is a flowchart indicating an embodiment of the shooting assist method of the present invention.

FIG. 2 is a flowchart indicating an example of the shooting assist method of the present invention. In this embodiment, a group includes five persons A, B, C, D, and E.

Figure 3A:
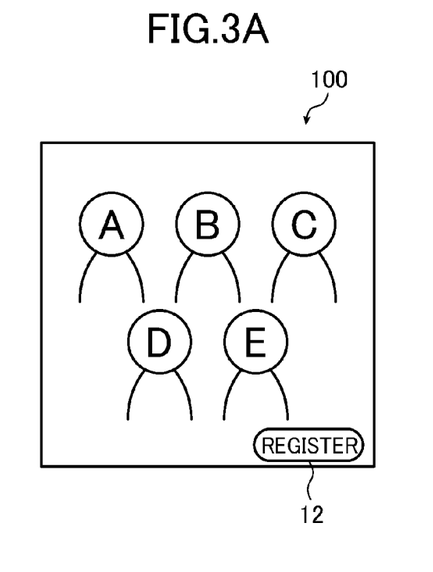
FIG. 3A illustrates an example of photography for registering a plurality of persons.
Figure 3B:
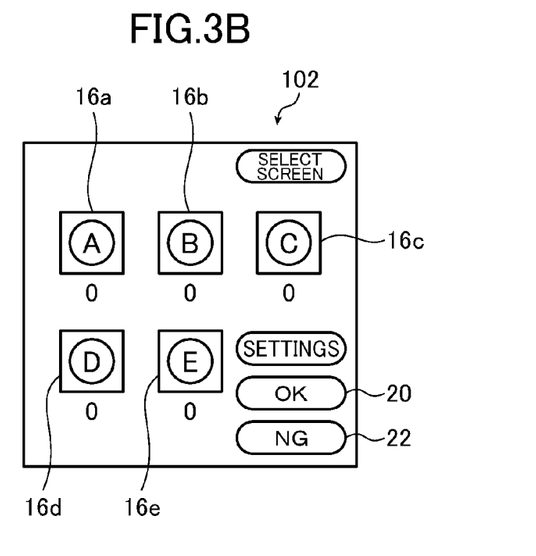
FIG. 3B illustrates an example of a screen for performing and registering face recognition of persons.

When the shooting device 200 is turned on, judgment is made as to whether the first identification data of persons have been set (step S2), and when the first identification data of persons have not been set ("N" in the step S2), a group photograph 100 is acquired of all the persons A to E of the group as illustrated in FIG. 3A (step S3). Upon the image being acquired, a registration button 12 is pressed, whereupon the faces of A to E are extracted by face recognition (recognition images are acquired), the first identification data are produced, and a registration screen 102 illustrated in FIG. 3B is displayed on the display means 214 (step S4).

In the registration screen 102, extracted faces 16a to 16e of A to E are displayed, with the numerals beneath them indicating the numbers of images so far acquired respectively. Upon depression of an OK button 20, registration is effected to select a normal shooting mode. Upon depression of an NG button 22, the group photograph 100 is taken again.

Where the first identification data of persons have been already set ("Y" in the step S2) in the course of shooting, normal shooting can be performed without the group photograph 100 being taken (step S6).

Where setting or registration of the first identification data of A to E of the group has been completed, or where the first identification data has already been set, normal shooting is performed (step S6). The operator can take, for example, snapshots of A to E.

When photographs have been taken, face recognition is performed with the normal acquired image data each time a photograph is taken to extract faces. Thus, a recognition image is acquired, and second identification data is produced. The produced second identification data and the first identification data are matched to determine a person that was shot (step S8). The numbers of images of A to E are tallied based on the judgment results (matching data) (step S10). Tallies are also made separately for each of the shooting tendency factors for A to E.

The first identification data may be automatically registered in the course of shooting. For example, the first identification data of a person having no first identification data and shot together with another person already face-recognized and having the first identification data may be automatically registered. Further, when a person having no first identification data has been shot near the center of the viewfinder (shooting area), or, in other words, shot as a major subject, the first identification data of that person may be automatically registered. Further, when a person having no first identification data has been shot with his/her face greater than a given size, the first identification data of that person may be automatically registered. In each of the above cases, shooting may be performed automatically.

Further, the first identification data may be registered using a touch panel, not shown, provided on the display means 214 during shooting as the operator touches the face of a person having no first identification data in an image displayed on the display means 214 acting as the viewfinder. Likewise, the first identification data may be registered by displaying an image acquired in the past on the display means 214 and touching the face of a person having no first identification data on that acquired image.

When the numbers of images acquired were tallied, judgment is made as to whether all the group members have been shot (step S12) and, in the negative ("N" in the step S12), judgment is further made as to whether a particular person or persons are shot disproportionately more often (step S26). When no particular person is favored in being a subject ("N" in the step S26), judgment is made as to whether shooting is to be terminated (e.g., whether a switch has been turned on) (step S36), and when shooting is to be continued ("N" in the step S36), the procedure returns to the step S6 to enable a next image to be acquired.

Figure 4A:
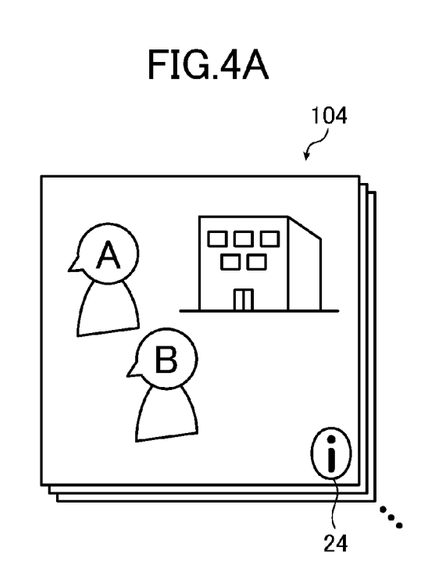
FIG. 4A illustrates an example of a screen shown during shooting.

When all the group members have been shot ("Y" in the step S12), an icon 24 is shown in a shooting screen 104 as illustrated in FIG. 4A (step S14). Next, judgment is made as to whether shooting is to be terminated (step S16), and when shooting is to be continued ("N" in the step S16), judgment is made as to whether the icon 24 has been clicked (step S18).

Upon the click of the icon ("Y" in the step S18), the display switches to the image verification screen 106 to show the tally results (step S20).

Figure 4B:
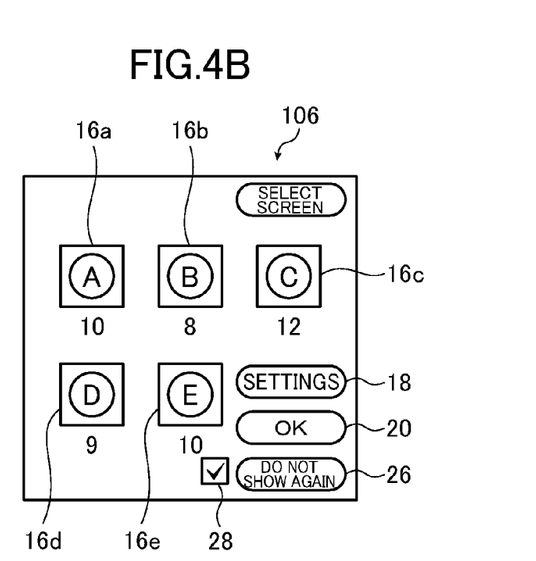
FIG. 4B illustrates an example of a verification screen shown when all the subjects have been shot.

The image verification screen 106 illustrated in FIG. 4B shows the numbers of images acquired beneath the faces 16a to 16e of A to E. Checking a box 28 of a NOT TO DISPLAY button 26 deactivates the display of the icon 24 in the shooting screen 104 thereafter even when all the group members have been shot. The display switches back to the shooting screen 104 upon depression of the OK button 20.

When the icon 24 is not clicked ("N" in the step S18), the procedure returns to the step S6 to allow shooting to be continued. The icon 24 remains displayed. The icon 24 remains displayed until it is clicked.

Upon the display switching from the image verification screen 106 back to the shooting screen 104, judgment is further made as to whether a particular person is favored in being a subject (step S26). When a particular person is favored in being a subject ("Y" in the step S26), an icon 30 is shown as in the shooting screen 108 illustrated in FIG. 5A (step S28). Next, when the icon 30 is judged to have been clicked in the step S30 ("Y" in the step S18), the display switches to an image verification screen 106a to display the tally results (step S32).

Figure 5A:
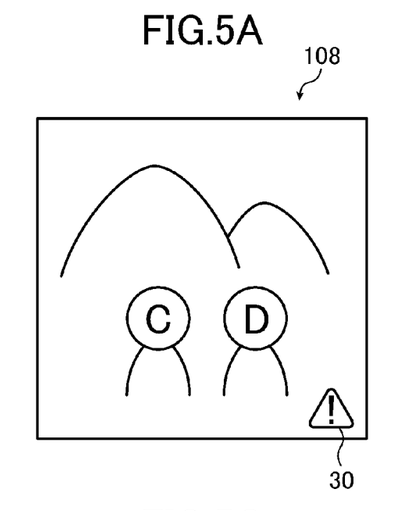
FIG. 5A illustrates an example of a screen shown during shooting.
Figure 5B:
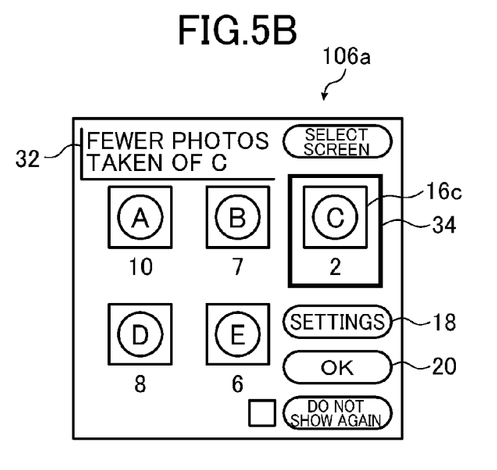
FIG. 5B illustrates an example of the verification screen shown when there is an imbalance in image contents.

The image verification screen 106a illustrated in FIG. 5B indicates the numbers of images acquired respectively beneath the faces 16a to 16e of A to E and displays a message 32 that C has been shot less often than the other persons while C's face 16c is highlighted as indicated by reference numeral 34.

Figure 6:
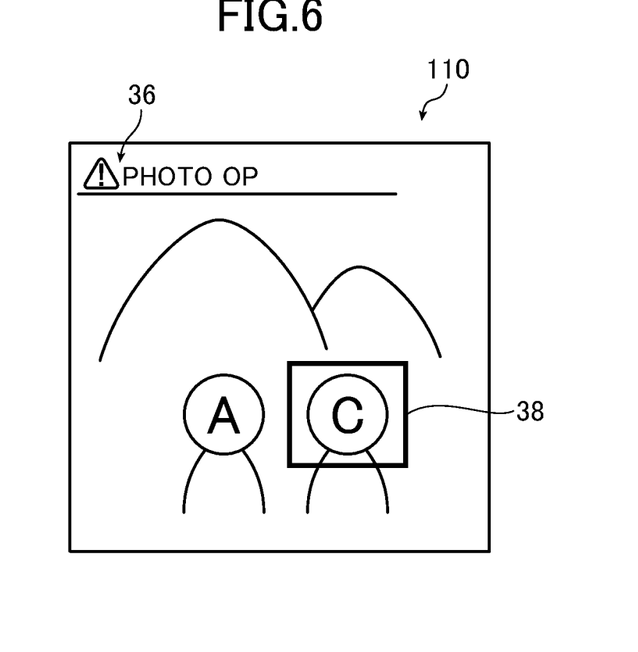
FIG. 6 illustrates an example of a shooting assist screen related to a person of which fewer images have been acquired.
Figure 7:
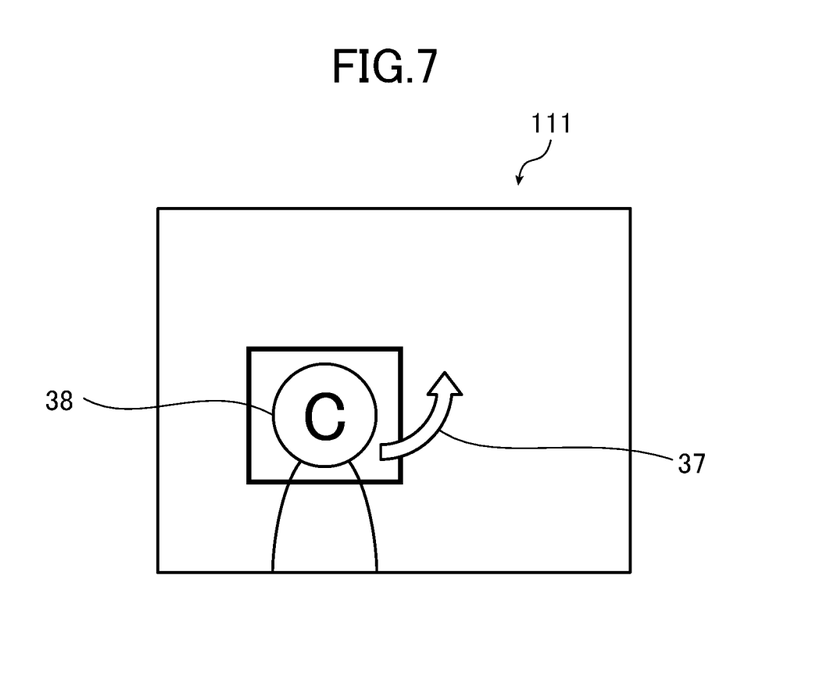
FIG. 7 illustrates another example of the shooting assist screen.

Now, upon the operator clicking C's face 16c, a "C shooting mode" is selected as a mode for shooting a particular person and, upon depression of the OK button 20, the C shooting mode is set (step S34). Then, judgment is made as to whether shooting is to be terminated (step S16), and when shooting is to be continued ("N" in the step S16), the procedure returns to the step S6 to enable a next acquired image to be acquired in the set C shooting mode.

Where the "C shooting mode" is set as a mode for shooting a particular person, when, for example, C enters the viewfinder as in a shooting screen 110 illustrated in FIG. 6, the operator can be prompted to shoot C as a message 36 is displayed or a frame 38 is displayed around C's face. The operator may also be prompted by sound to shoot C.

Further, the focus may be automatically placed on C when he/she enters the viewfinder.

Upon C being shot, the C shooting mode (specific person shooting mode) is automatically cleared.

Figure 5C:
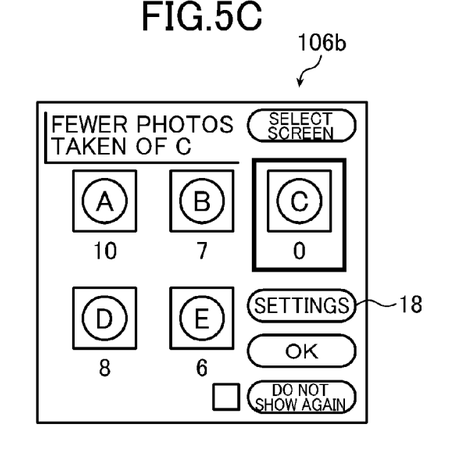
FIG. 5C illustrates another example of the verification screen shown when there is an imbalance in the contents of images.

The icon 30 in the shooting screen 108 is displayed when, for example, the difference between the largest number of images (of A) and the smallest number of images (of C) has reached a given number or when there is a person (C) of whom no image has been acquired in a predetermined length of time as illustrated in an image verification screen 106b in FIG. 5C Alternatively, when a person (person C) of whom a smaller number of images have been acquired with a particular shooting tendency factor enters the viewfinder, the frame 38 in lieu of the icon 30 may be shown around the face of C with an arrow 37 indicating a direction for meeting the particular shooting tendency factor. When, for example, the number of images of C acquired in profile is relatively small, the frame 38 is shown around C's face while the arrow is shown that indicates a direction for shooting the person in profile. In this case, a photograph meeting a particular shooting tendency factor, i.e., a photograph of C in profile, can be acquired if the operator moves in the direction indicated by the arrow or if C turns or moves opposite to the direction indicated by the arrow. An image may be automatically acquired when conditions meeting a particular shooting tendency factor are reached.

Figure 8:
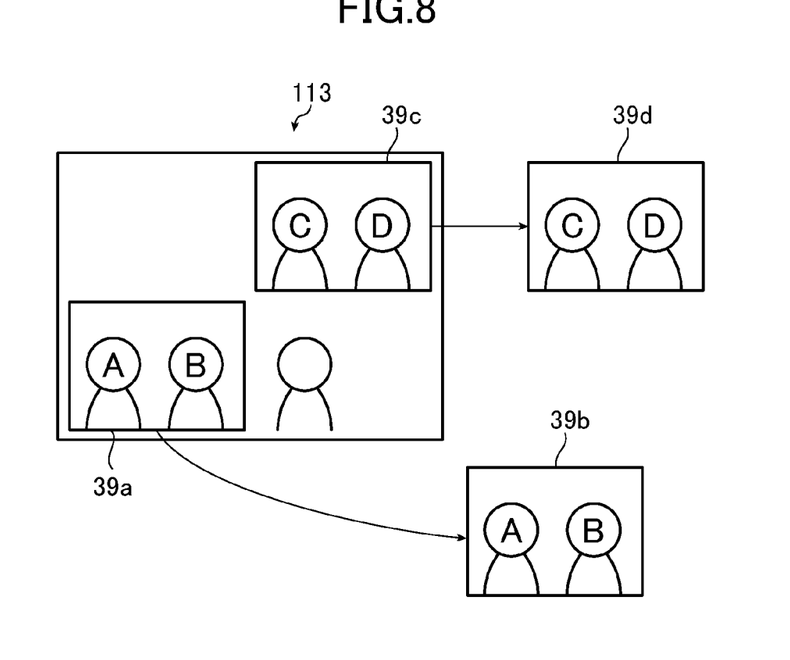
FIG. 8 illustrates an example in which a plurality of image data are cut from image data acquired with a high resolution.

Further, when a plurality of persons having the first identification data and of whom smaller number of images have been acquired enter the viewfinder, spread therein, as in a shooting screen 113 illustrated in FIG. 8, shooting may be performed with a higher resolution than is normally used and the image in the viewfinder may be trimmed into areas each containing at least one of the persons spread in the viewfinder, so that a plurality of image data of the images may be acquired. When, for example A and B are located at the lower left, and C and D at the upper right in the viewfinder, an image is acquired with a higher resolution than is normally used, an area 39a containing A and B and an area 39c containing C and D are cut out to acquire image data 39b, 39d, respectively. In this case, the cut-out image data 39b, 39d can be image data having the same resolution as the normal acquired image data because the original acquired image data is acquired with a higher resolution than is used in normal shooting. Thus, a plurality of image data can be acquired by taking only one acquired image.

Figure 9:
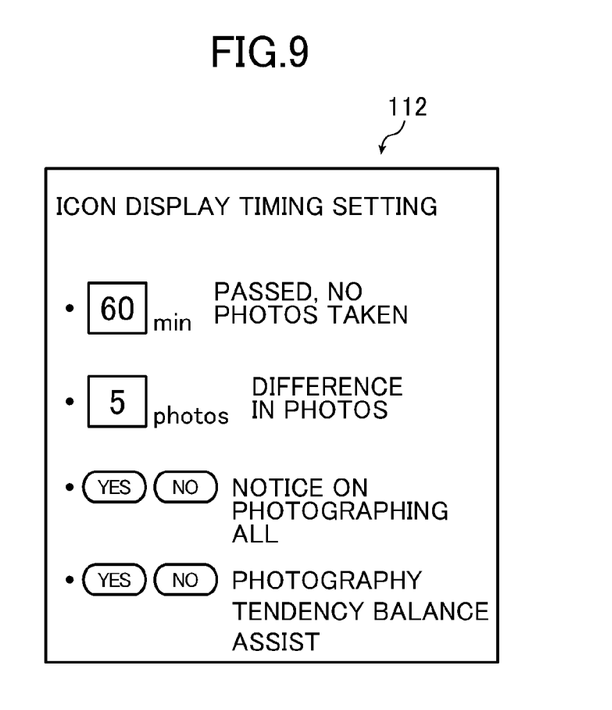
FIG. 9 illustrates an example of a setting screen.

A setting button 18 displayed in the image verification screens 106, 106a, and 106b, etc. may be used to select a setting screen 112 illustrated in FIG. 9 and set the conditions for displaying the icon 30 and the arrow 37 and for acquiring a plurality of acquired image data from a single acquired image acquired with a high resolution.

The setting screen 112 is set to show the icon 30 in the shooting screen 108 when, for example, the above difference in the number of images that have been acquired has reached five, or when there is a person of whom no image has been acquired for 60 minutes. In the shooting screen 104, the icon 24, which is shown when all the persons have been shot, may be set to be shown or not to be shown as desired. Whether shooting assist should be provided for maintaining a balance in shooting tendency based on a shooting tendency factor for which only a small number of images have been acquired may also be set.

Figure 10A:
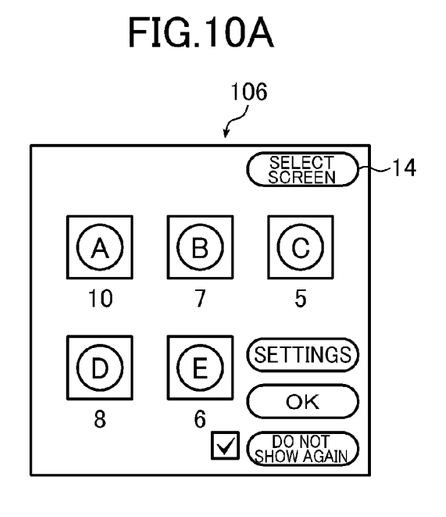
FIG. 10A illustrates an example of the verification screen shown upon completion of shooting.

After some images have been acquired, when the operator terminates shooting ("Y" in the step 16, and "Y" in the step 36), tally results are displayed on the image verification screen 106 illustrated in FIG. 10A, and the settings of the first identification data of the group members are cleared (step S38).

Thus, the operator can achieve shooting with impartiality among the members of the group by shooting with the above shooting assist.

Next, other examples of the tally results shown on the image verification screens 106, 106a, and 106b will be described.

Figure 10B:
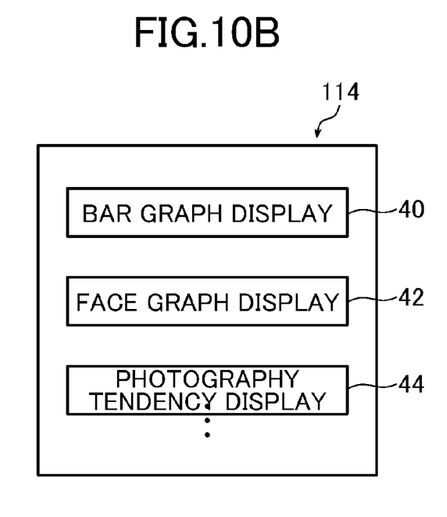
FIG. 10B illustrates an example of a screen for selecting another kind of verification screen.

Upon depression of a display selector button 14 displayed on the image verification screen 106 illustrated in FIG. 10A, the screen switches to a display selector screen 114 illustrated in FIG. 10B.

The display selector screen 114 shows, for example, a bar graph display button 40, a face graph display button 42, and a shooting tendency display button 44, and depression of these buttons indicate corresponding graphs (histograms).

FIGS. 11A to 11D illustrate examples of two-dimensional graphs.

Figure 11A:
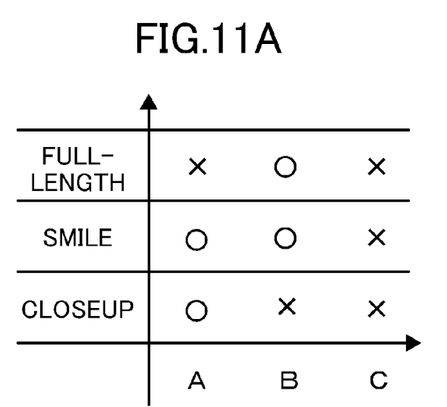
FIGS. 11A to 11D illustrate examples of two-dimensional graphs.

FIG. 11A illustrates an example of two-dimensional graph selectable in the display selector screen 114 showing whether A, B, and C have been shot with the compositions (shooting tendency factors) of full length, smile, and close-up. The circles indicate "shot" and the crosses indicate "yet to be shot."

FIG. 11A illustrates another example showing the numbers of images of A, B, and C that have been acquired with the compositions of full length, smile, and close-up. Compared with the two-dimensional graph illustrated in FIG. 11A, the graph of FIG. 11B, showing the numbers of photographs, allows the operator to know for which shooting tendency factor and of which person fewer images have been acquired.

Figure 11B:
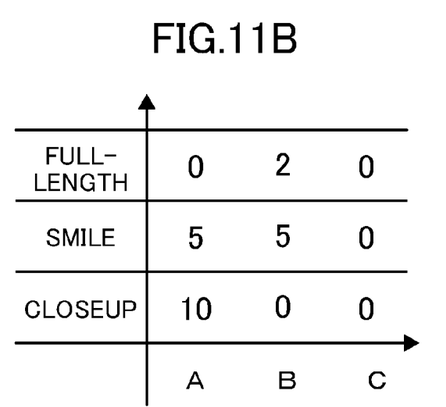

Click of any of the shooting tendency factors in which no image has been acquired in the two-dimensional graphs of FIGS. 11A and 11B sets a shooting mode in which the next images are acquired. For example, the shooting tendency factor "full length" for A in the two-dimensional graph of FIG. 11A is marked X indicating that no image has been acquired. Clicking this cross mark sets a shooting mode in which appropriate conditions for shooting A in full length, such as shutter speed, aperture, zoom, for the next images to be acquired, thus permitting the operator to shoot A in full length.

Figure 11C:
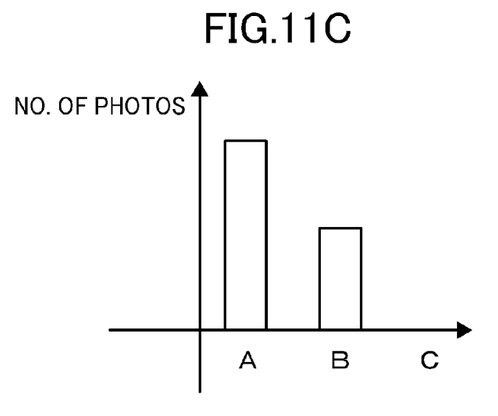
Figure 11D:
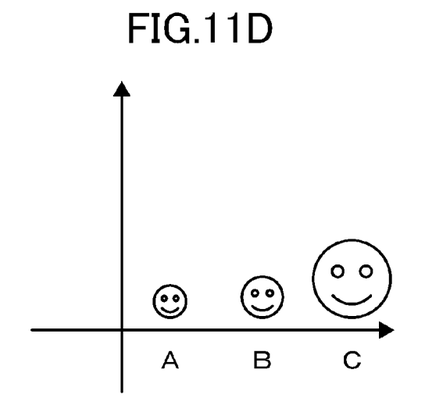

FIG. 11C shows another example, in which the numbers of images acquired of A, B, and C are represented in bar graph; FIG. 11D likewise shows the number of images in face graph. Also in these examples as in FIG. 11A, clicking any of the persons, bar graph, and face graph sets a shooting mode in which appropriate conditions for shooting a clicked or selected person are set, thus permitting the operator to readily shoot the selected person.

The subject displayed in the two-dimensional graph is not limited to persons, and the shooting assist of the invention may be applied to subjects including landscape, prepared food, buildings, sign boards (characters), and vehicles using scene analysis. Use of scene analysis enables shooting assist to be provided in other subjects than persons, whereby when, for example, a family make a trip, a message is displayed or a notice is otherwise given in cases where there is an imbalance in the number of images acquired among not only members of the family but scenery of tourist sites, landmarks, scenes of meals, etc., to achieve well-balanced shooting among subjects such as landscapes other than persons. The two-dimensional graph may be of other kinds than are described above including a circle graph and a graph showing the numbers of images acquired of the subjects represented per each unit time frame depending on the displayed subjects.

Although, in the above embodiment, a group photograph for producing the first identification data is acquired by the shooting device 200, the invention is not limited this way. As in a shooting system illustrated in FIG. 12, the first identification data can be set simultaneously for a plurality of digital cameras 60 by loading image data of a previously acquired group photograph from a digital camera 50 into a PC (personal computer) 58, producing first identification data in the PC 58, and uploading the image data and the first identification data to a server 54 via Internet to store the data in a storage unit 56 of the server 54, so that the digital cameras 60 that implement the shooting assist method of the invention may communicate with the server 54 via Internet. Alternatively, existing first identification data already registered may be used. The first identification data may be produced in the server 54. Further, the first identification data may be added in the course of shooting through communication with the server 54.

Figure 12:
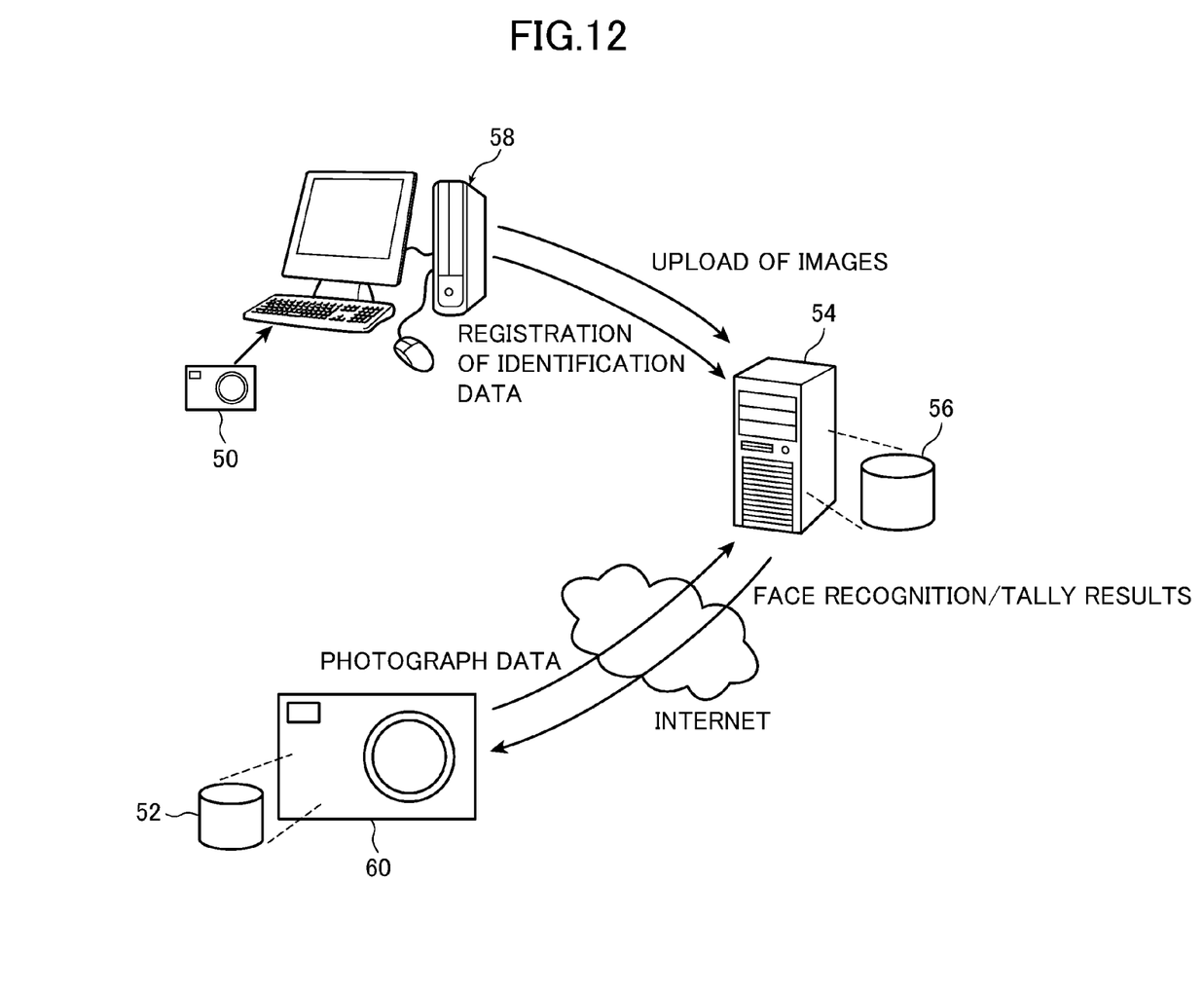

Further, as the digital cameras 60 communicate with the server 54 via Internet to transmit or receive the first identification data, acquired image data, the tally results data (e.g. two-dimensional graph), the number of acquired images, or the range of proportion thereof, and the like, the digital cameras 60 that implement the shooting assist method of the invention can, for example, share the first identification data, acquired image data, the tally results data, the number of acquired images, the given range, and the like produced by any of the digital cameras 60 and stored in the storage unit 52, and the operators of these cameras can download the data onto their respective cameras 60 and use the data. Thus, even when there are a plurality of operators, they can share the knowledge as to what images have been acquired by other cameras 60, making it possible to provide shooting assist in acquiring images corresponding to a shooting pattern falling short of a given range for the whole group and thus to even out the imbalance, if any, among the persons constituting the group.

Further, when the digital cameras 60 have the GPS function or other means for acquiring position information, navigation to places where other operators often take images is made possible by having map information and position information on the locations where the other operators took images in the server 54.

As described above, the present invention makes it possible to take images of the members of a group without partiality. Further, use of image data acquired using the shooting assist method, program, shooting device, and shooting system of the present invention enables production of a photograph album that satisfies the members of the group to an enhanced degree.

The steps taken in the above shooting assist method may be configured as a shooting assist program for causing a computer to execute the steps of the shooting assist method described above, or may be configured as a shooting assist program enabling a computer to function as means for executing the respective steps of the shooting assist method or to function as means for forming components of the shooting device described above.

Further, the above shooting assist program may be configured in the form of a computer readable medium or a computer readable memory.

While the shooting assist method, program, shooting device, and shooting system according to the invention have been described in detail above, the present invention is not limited to the above embodiments, and various modifications may be made without departing from the spirit and scope of the invention.

We claim:

1. A shooting assist method for acquiring an image comprising the steps of:
producing first identification data used as reference,
performing subject recognition on acquired images of subjects to obtain recognition images, producing second identification data of the subjects of the acquired images, and matching the first identification data with the second identification data,
tallying the acquired images based on matching results for each subject having the first identification data and by shooting tendency factor,
judging whether a number of the acquired images or a proportion of the number of the acquired images of the subjects having the first identification data in respect of each of the shooting tendency factors is within a given range from tally results obtained by tallying the acquired images, and
providing shooting assist so that the number of the acquired images of the subjects or the proportion of the number of the acquired images of the subjects having the first identification data in respect of the shooting tendency factor judged to be outside the given range is placed within the given range, wherein, when a number of the acquired images or a proportion of the number of the acquired images of a particular subject having the first identification data and containing a particular shooting tendency factor is smaller than a given threshold, shooting assist is provided in respect of the particular subject having the first identification data and containing the particular shooting tendency factor so as to place the number of the acquired images or the proportion of the number of the acquired images within the given range.

2. The shooting assist method according to claim 1, wherein the subject is a person and the subject recognition is face recognition.

3. The shooting assist method according to claim 1, wherein the subject is an animal and the subject recognition is animal recognition.

4. The shooting assist method according to claim 1, wherein the subject is a landscape and the subject recognition is landscape recognition.

5. The shooting assist method according to claim 1, wherein the subject is a still object and the subject recognition is still object recognition.

6. The shooting assist method according to claim 1, wherein the subject is a part of a human body and the subject recognition is human body part recognition.

7. The shooting assist method according to claim 1, further comprising a step of setting the given range separately for the individual first identification data.

8. The shooting assist method according to claim 7, wherein a range entered by an operator who acquires the acquired images is set as the given range.

9. The shooting assist method according to claim 7, wherein a range entered by a person who provides service of producing photographic prints from the acquired images in association with a product is set as the given range.

10. The shooting assist method according to claim 7, wherein the given range is set according to a print size.

11. The shooting assist method according to claim 2, wherein when a face of the person in an image to be acquired is smaller than a given size, a size of the acquired image is changed automatically.

12. The shooting assist method according to claim 2, wherein when a person of whom the number of the acquired images or the proportion of the number of the acquired images has yet to reach a given number is in a shooting area, a moving image recording mode or a continuous shooting mode is selected automatically.

13. The shooting assist method according to claim 1, wherein tally results of the acquired images are displayed by subject having the first identification data or by means of a two-dimensional graph.

14. The shooting assist method according to claim 13, wherein the two-dimensional graph provides shooting assist by showing a bar graph in which the number of the acquired images is shown on a vertical axis and a plurality of subjects having the first identification data are shown on a horizontal axis.

15. The shooting assist method according to claim 13, wherein the two-dimensional graph provides shooting assist by showing subjects having the first identification data on a horizontal axis and by displaying an enlarged face of a subject having the first identification data and having a small number of the acquired images in the tally results.

16. The shooting assist method according to claim 13, wherein the two-dimensional graph provides shooting assist by showing the shooting tendency factors on a vertical axis and the subjects having the first identification data on a horizontal axis and by displaying shooting tendency separately for each of the subjects having the first identification data.

17. The shooting assist method according to claim 13, wherein a shooting mode is automatically set by selecting one or more of subjects having the first identification data or one or more of items, the shooting tendency factors, and the tally results in the two-dimensional graph.

18. The shooting assist method according to claim 17, wherein the shooting mode is a mode in which when a subject having the first identification data and of whom no acquired image has been acquired has been selected, and when the subject having the first identification data enters a viewfinder at a next shooting timing, the subject having the first identification data is automatically brought into focus and shot.

19. The shooting assist method according to claim 17, wherein the shooting mode is a mode in which when a subject having the first identification data and of whom no acquired image has been acquired is selected, shooting is prompted by sound when the subject having the first identification data enters a viewfinder at a next shooting timing.

20. The shooting assist method according to claim 17, wherein the shooting mode is a mode in which when a subject having the first identification data and of whom no acquired image has been acquired is selected, shooting is prompted by displaying a message when the subject having the first identification data enters a viewfinder at a next shooting timing.

21. The shooting assist method according to claim 17, wherein the shooting mode is a mode in which when a subject having the first identification data and of whom no image has been acquired is selected, shooting is prompted by displaying a frame around a face of the subject having the first identification data when the subject having the first identification data enters a viewfinder at a next shooting timing.

22. The shooting assist method according to claim 17, wherein the shooting mode is a mode in which appropriate shooting conditions are set for complementing a selected shooting tendency factor.

23. The shooting assist method according to claim 1, wherein the shooting assist is one or more of display of a message, sounding of an audio notice, and display of a subject having the first identification data of whom a smaller number of images have been acquired.

24. The shooting assist method according to claim 1, wherein when a disproportionately large number of images have been acquired of a particular subject having the first identification data, the shooting assist prompts a operator to shoot also other subjects having the first identification data.

25. The shooting assist method according to claim 1, wherein when other subjects having the first identification data enters a viewfinder, an instruction is displayed so that the particular shooting tendency factor is complemented.

26. The shooting assist method according to claim 25, wherein the instruction is such that a frame is displayed around a face of the other subjects having the first identification data and an arrow is displayed to indicate a direction for meeting the particular shooting tendency factor.

27. The shooting assist method according to claim 25, wherein when a condition in which the particular shooting tendency factor is complemented is reached, shooting is automatically achieved.

28. The shooting assist method according to claim 1, wherein when other subjects having the first identification data enter a viewfinder, spread therein, shooting is performed with a higher resolution than is used for normal shooting and an acquired image is trimmed into areas each containing at least one of the subjects spread therein and having the first identification data so as to acquire a plurality of acquired image data from the acquired images.

29. The shooting assist method according to claim 1, wherein when the number of acquired images has reached or exceeded a given number or when a storage device for storing the acquired images has no longer a free space left that is greater than a given space, the number of the acquired images or the given range of the proportion of the number of images is changed.

30. A computer program product, comprising a computer readable recording medium having a computer program code recorded thereon, for causing a computer to execute the steps of the shooting assist method described in claim 1.

31. A non-transitory computer readable recording medium wherein the computer program code described in claim 30 is recorded.

32. A shooting device for assisting in shooting when acquiring an image comprising the steps of:
 a shooting unit,
 an identification data production unit for producing first identification data used as reference,
 a matching unit for performing subject recognition on acquired images of subjects acquired by the shooting unit to obtain recognition images, producing second identification data of the subjects of the acquired images, and matching the first identification data with the second identification data,
 a tally unit for tallying the acquired images based on matching results for each subject having the first identification data and by each shooting tendency factor,
 a shooting tendency factor judgment unit for judging whether a number of the acquired images or a proportion of the number of the acquired images of the subjects having the first identification data in respect of each of the shooting tendency factors is within a given range from tally results obtained by tallying the acquired images, and
 a shooting assist unit for providing shooting assist so that the number of the acquired images or the proportion of the number of the acquired images of the subjects having the first identification data in respect of the shooting tendency factor judged to be outside the given range is placed within the given range,
 wherein, when a number of the acquired images or a proportion of the number of the acquired images of a particular subject having the first identification data and containing a particular shooting tendency factor is smaller than a given threshold, shooting assist is provided in respect of the particular subject having the first identification data and containing the particular shooting tendency factor so as to place the number of the acquired images or the proportion of the number of the acquired images within the given range.

33. A shooting system comprising:
 devices described in claim 32 and
 a server for storing the first identification data, the given range, and image data of the acquired images uploaded through the Internet,
 wherein the shooting devices share the first identification data, the given range, and the image data of the acquired images stored in the server through the Internet and download these data for use.

* * * * *